(12) United States Patent  
Kihara et al.

(10) Patent No.: US 8,903,184 B2  
(45) Date of Patent: Dec. 2, 2014

(54) IMAGE-ENCODING METHOD, IMAGE-ENCODING DEVICE, AND COMPUTER-READABLE RECORDING MEDIUM STORING IMAGE-ENCODING PROGRAM

(75) Inventors: Masahiro Kihara, Fukuoka (JP); Takato Ohashi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 13/402,305

(22) Filed: Feb. 22, 2012

(65) Prior Publication Data

US 2012/0237132 A1 Sep. 20, 2012

(30) Foreign Application Priority Data

Mar. 15, 2011 (JP) ................... 2011-057271

(51) Int. Cl.
*G06K 9/00* (2006.01)
*H04N 19/86* (2014.01)
*H04N 19/61* (2014.01)

(52) U.S. Cl.
CPC ... *H04N 19/00781* (2013.01); *H04N 19/00909* (2013.01)
USPC .......................................................... 382/232

(58) Field of Classification Search
USPC .......................................................... 382/239
See application file for complete search history.

(56) References Cited

U.S. PATENT DOCUMENTS

| | | | |
|---|---|---|---|
| 7,738,716 B2 * | 6/2010 | Song | 382/239 |
| 2009/0052536 A1 * | 2/2009 | Tajime | 375/240.13 |
| 2010/0002103 A1 * | 1/2010 | Shintani | 348/251 |
| 2010/0053357 A1 * | 3/2010 | Ikeda | 348/222.1 |

FOREIGN PATENT DOCUMENTS

| | | |
|---|---|---|
| JP | 2010-523054 | 7/2010 |
| WO | WO 2008/118562 | 10/2008 |

* cited by examiner

*Primary Examiner* — Hadi Akhavannik
(74) *Attorney, Agent, or Firm* — Staas & Halsey LLP

(57) ABSTRACT

A method for encoding an image having a resolution that is not a multiple of a size of a block to be encoded, includes adding, by a processor, an extension image to the image to generate an image to be encoded, the extension image being an image to be added to the image and being an image in which a boundary pixel that is present at a boundary between the extension image and the image, and an adjacent pixel that is adjacent to the boundary pixel have a difference in pixel value therebetween that has an absolute value that is equal to or greater than a certain value; and disabling a deblocking filter process at the boundary between the extension image and the image in a locally decoded image that corresponds to the image to be encoded.

13 Claims, 17 Drawing Sheets

FIG. 1

| DEBLOCKING FILTER | | IMAGE EXTENSION METHOD | CHARACTERISTICS |
|---|---|---|---|
| ENABLED | | BLACK OR GREY FIXED PATTERN | OCCURRENCE OF LEAKAGE OF EXTENSION IMAGE |
| | | EXTENSION OF EDGE OF IMAGE | LARGE PROCESSING LOAD |
| BLOCK-DISABLED | | — | OCCURRENCE OF BLOCK NOISE IN ENTIRE REGION OTHER THAN BOUNDARY BETWEEN EFFECTIVE IMAGE AND EXTENSION IMAGE |
| DISABLED | | — | OCCURRENCE OF BLOCK NOISE IN ENTIRE IMAGE |

FIG. 6

| QP | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| β | 0 | 0 | 0 | 0 | 0 | 0 | 0 | 0 | 0 | 0 | 0 | 0 | 0 | 0 | 0 | 0 | 2 |

| 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| 2 | 2 | 3 | 3 | 3 | 3 | 4 | 4 | 4 | 6 | 6 | 7 | 7 | 8 | 8 | 9 | 9 | 10 |

| 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|
| 10 | 11 | 11 | 12 | 12 | 13 | 13 | 14 | 14 | 15 | 15 | 16 | 16 | 17 | 17 | 18 | 18 |

FIG. 12

| EXTENSION METHOD | CHARACTERISTICS |
|---|---|
| EXTENSION USING BLACK OR GREY FIXED PATTERN | WHEN DEBLOCKING FILTER IS ENABLED, DEGRADATION IN IMAGE QUALITY OWING TO LEAKAGE OF EXTENSION IMAGE. WHEN DEBLOCKING FILTER IS DISABLED, DEGRADATION IN IMAGE QUALITY OWING TO BLOCK NOISE AND THE LIKE |
| EXTENSION OF EDGE OF IMAGE | SMALL DEGRADATION IN IMAGE QUALITY |
| EMBODIMENT | SMALL DEGRADATION IN IMAGE QUALITY |

FIG. 13

```
GetPixel(x,y){
  if(y>1080){                  (1)
    y=1080;                    (2)
  }
  return FrameMemory[y][x];    (3)
}
```

FIG. 14

| EXTENSION METHOD | CHARACTERISTICS |
|---|---|
| EXTENSION USING BLACK OR GREY FIXED PATTERN | SMALL INCREASE IN PROCESSING TIME FOR EXTENSION |
| EXTENSION OF EDGE OF IMAGE | LARGE INCREASE IN PROCESSING TIME FOR EXTENSION |
| EMBODIMENT | LARGE INCREASE IN PROCESSING TIME FOR EXTENSION |

IMAGE-ENCODING METHOD, IMAGE-ENCODING DEVICE, AND COMPUTER-READABLE RECORDING MEDIUM STORING IMAGE-ENCODING PROGRAM

CROSS-REFERENCE TO RELATED APPLICATION

This application is based upon and claims the benefit of priority of the prior Japanese Patent Application No. 2011-57271, filed on Mar. 15, 2011, the entire contents of which are incorporated herein by reference.

FIELD

The embodiments discussed herein are related to an image-encoding method, an image-encoding device, and a computer-readable recording medium which stores an image-encoding program which encode an image and have a deblocking filter function.

BACKGROUND

Multimedia has recently become popular, and a moving picture has been used more frequently. Image data has a large amount of information, and a moving picture, which is a sequence of images, has an amount of information corresponding to a bit rate of over 1 Gbit/sec with the Hi-Vision (1920×1080) broadcast which is a mainstream of TV broadcasts. A network environment, which is used for transmitting data of a moving picture, uses a band having a bit rate of 100 Mbit/sec at most even in optical services. Moreover, a bit rate in an effective band is on the order of 20 Mbit/sec, which is not large enough to transmit a moving picture as it is.

Furthermore, a maximum of seven minutes of Hi-Vision data may be recorded on a Blu-ray Disc, which is a typical storage medium, when the Blu-ray Disc has a dual structure for 50 GB. Accordingly, a compression encoding technique typified by H.264/AVC, for example, is used to compress the amount of information, and the compressed information is transmitted and stored.

H.264/AVC, a standard technique for encoding, uses tools, including an orthogonal transform, inter-frame prediction, intra-frame prediction, arithmetic encoding, and deblocking filtering, to achieve compression of a moving picture down to as small as about one-hundredth of the original size of the moving picture. A deblocking filter, which is one of the tools used in H.264/AVC, serves in such a manner that occurrence of block noise owing to encoding being performed on a macroblock basis is suppressed. A deblocking filter effectively suppresses degradation in image quality especially when a compression ratio is set to high.

Super Hi-Vision (7680×4320) technology, which has a resolution that is 16 times that of Hi-Vision, is currently being researched and developed actively. However, encoders and decoders that are compatible with Super Hi-Vision have not been developed. Consequently, Super Hi-Vision data is divided into pieces of data having a Hi-Vision size, which are individually subjected to a process using multiple encoders and decoders. With H.264/AVC, encoding is performed on a 16×16 macroblock basis. However, the size of a Hi-Vision image, 1920×1080, is not a multiple of sixteen. When a Hi-Vision image is to be encoded, the image is extended so as to become an image having a size of 1920×1088.

Typical methods for extending an image include a method in which a black or grey fixed pattern is added to the image, and a method in which an image portion at the edge of the image is extended. To suppress an adverse effect of an extension image on an original image (hereinafter, referred to as leakage of an extension image), which occurs when deblocking filtering is performed on the original image along with the extension image, the deblocking filter may be disabled when desired. Japanese National Publication of International Patent Application No. 2010-523054 describes deblocking filtering that achieves reductions in computational complexity and in memory access.

SUMMARY

In accordance with an aspect of the embodiments, a method for encoding an image having a resolution that is not a multiple of a size of a block to be encoded, includes adding, by a processor, an extension image to the image to generate an image to be encoded, the extension image being an image to be added to the image and being an image in which a boundary pixel that is present at a boundary between the extension image and the image, and an adjacent pixel that is adjacent to the boundary pixel have a difference in pixel value therebetween that has an absolute value that is equal to or greater than a certain value; and disabling a deblocking filter process at the boundary between the extension image and the image in a locally decoded image that corresponds to the image to be encoded.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 1 is a table describing exemplary characteristics of typical methods;

FIG. 6 is a table describing a threshold β;

FIG. 12 is a table describing a comparison of image quality;

FIG. 13 is a diagram illustrating an exemplary program for returning a pixel value;

FIG. 14 is a table describing a comparison of processing load;

DESCRIPTION OF EMBODIMENTS

The inventors of this application have found out new matters, which will be described below, by means of examination. Typical methods for extending an image include a method in which a black or grey fixed pattern is added to the image (hereinafter, referred to as a first extension method of the related art), and a method in which an image portion at the edge of the image is extended (hereinafter, referred to as a second extension method of the related art). FIG. 1 illustrates characteristics of these methods.

FIG. 1 is a table describing exemplary characteristics of the first and second methods of the related art. As illustrated in FIG. 1, in the first extension method of the related art, processing load is not increased when an image is extended. However, when a deblocking filter is enabled, leakage of the black or grey image into an original image occurs when deblocking filtering is performed on the original image along with the extension image which is not part of the original image, resulting in degradation in image quality.

For example, when a Super Hi-Vision image is divided and encoded, the image may be divided in the central portion of a screen, and the degradation in image quality caused by the leakage of the extension image will be observed as discontinuities in the image at the positions of division, resulting in an uncomfortable image.

Figure 2:
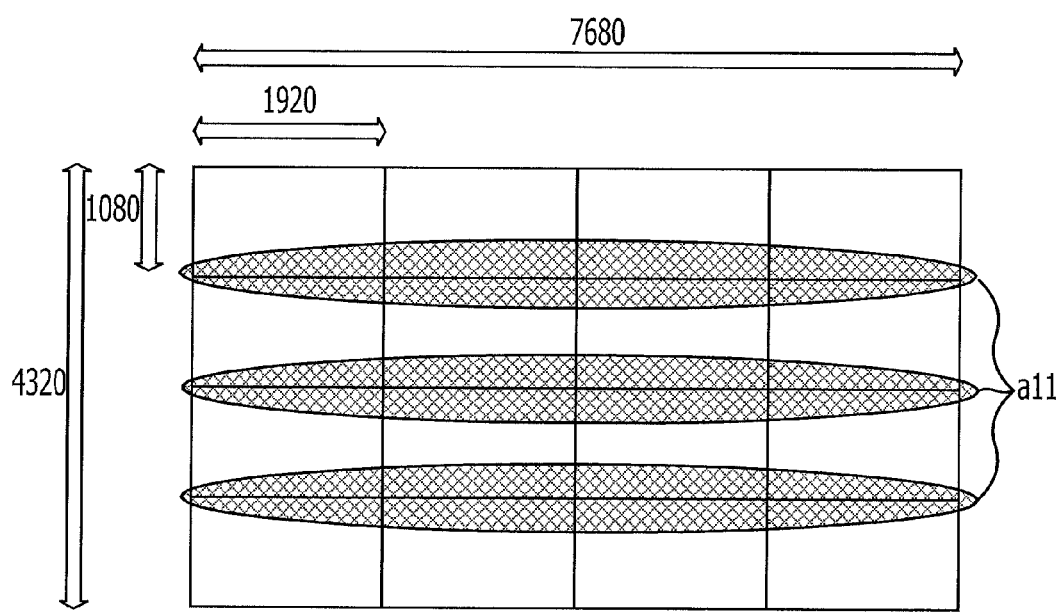
FIG. 2 is a diagram illustrating an effect to be addressed for Super Hi-Vision.

FIG. 2 is a diagram illustrating an effect to be addressed for Super Hi-Vision. The example illustrated in FIG. 2 describes a situation in which boundaries of images obtained by dividing a Super Hi-Vision image by Hi-Vision size are viewed as boundaries all owing to degradation in image quality caused by the leakage of the extension image.

Referring back to FIG. 1, when the deblocking filter is disabled, block noise fails to be reduced, resulting in degradation in image quality caused by the block noise. The deblocking filter may be disabled for blocks on a slice-by-slice basis. However, degradation in image quality may occur owing to block noise that is present in regions other than a portion for image extension.

In the second extension method of the related art, the degradation in image quality caused by the leakage of the extension image does not occur. However, extended data is individually generated and provided for an original image, resulting in an increase in processing load, compared with the first extension method of the related art. This increase in processing load occurs regardless of whether the deblocking filter is enabled or disabled.

Embodiments will be described with reference to the accompanying drawings.

Figure 3:
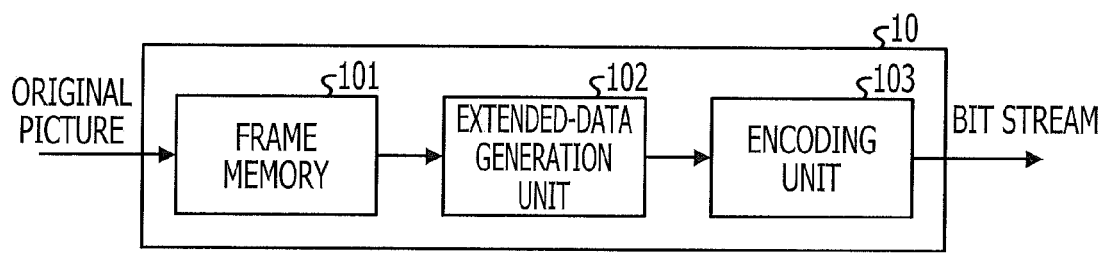
FIG. 3 is a block diagram illustrating an exemplary general configuration of an image-encoding device according to a first embodiment.

FIG. 3 is a block diagram illustrating an exemplary general configuration of an image-encoding device 10 according to a first embodiment. The image-encoding device 10 illustrated in FIG. 3 includes a frame memory 101, an extended-data generation unit 102, and an encoding unit 103.

The frame memory 101 stores an original image. The frame memory 101 also stores an extension image which is an image for extending the original image. According to the embodiment, in order to add a preset extension image to the original image, the frame memory 101 may store the extension image in advance.

The extension image is configured so as to allow the deblocking filter to be locally disabled at the boundary between the extension image and the original image when the extension image is added to the original image. The extension image will be described in detail below.

When the original image has a size which is not a multiple of a macroblock size, the extended-data generation unit 102 adds the extension image to the original image so that the size of the image to be encoded (the extended data) is a multiple of the macroblock size. This extension process is simple because the extended-data generation unit 102 simply adds the extension image to the original image.

This simple extension process allows an increase in processing load to be suppressed, compared with the second extension method of the related art.

The encoding unit 103 encodes the image to be encoded (hereinafter, referred to as an encoding-target image) which has a size of a multiple of sixteen, i.e., the macroblock size. The encoding unit 103 will be described in detail with reference to FIG. 4.

According to the embodiment described above, the frame memory 101 stores the extension image. Instead, the extended-data generation unit 102 may store the extension image therein. In this case, the extended-data generation unit 102 adds the extension image to the original image when appropriate.

Figure 4:
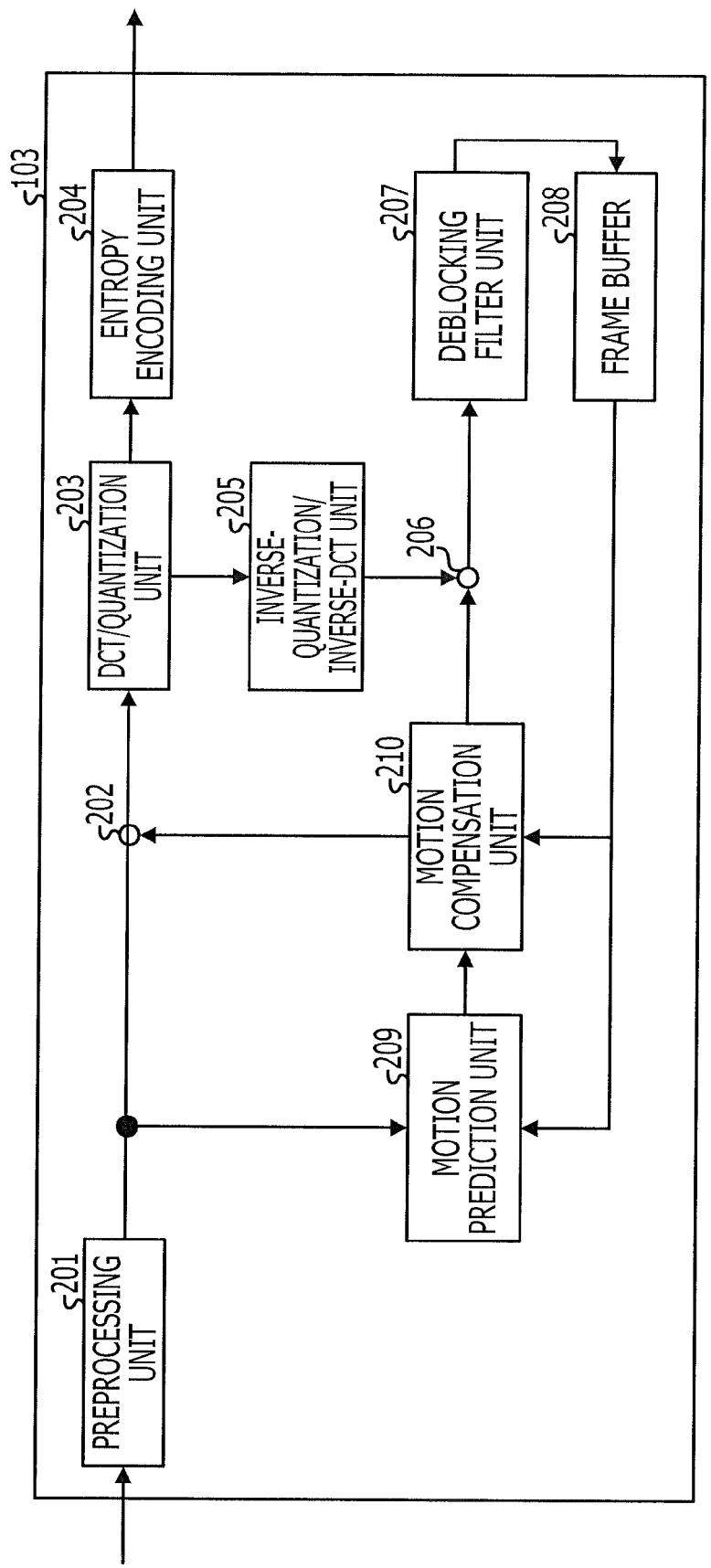
FIG. 4 is a block diagram illustrating an exemplary general configuration of an encoding unit.

FIG. 4 is a block diagram illustrating an exemplary general configuration of the encoding unit 103. The encoding unit 103 illustrated in FIG. 4 includes a preprocessing unit 201, a predictive-error-signal generation unit 202, a discrete cosine transform (DCT)/quantization unit 203, an entropy encoding unit 204, an inverse-quantization/inverse-DCT unit 205, and a decoded-image generation unit 206. The encoding unit 103 also includes a deblocking filter unit 207, a frame buffer 208, a motion prediction unit 209, and a motion compensation unit 210.

The preprocessing unit 201 includes a picture-ordering section for ordering pictures in accordance with the types of the pictures. The preprocessing unit 201 outputs frame images, for example, in sequence on a picture-type and frame basis. The preprocessing unit 201 may also generate a reduced image and determine a motion direction, for example.

The predictive-error-signal generation unit 202 acquires macroblock data (hereinafter, referred to as MB data) obtained by dividing the received encoding-target image of motion picture data into macroblocks (MBs) of 16×16 pixels. The predictive-error-signal generation unit 202 generates predictive error signals based on the obtained MB data and MB data of a predicted image that is output from the motion compensation unit 210. The predictive-error-signal generation unit 202 outputs the generated predictive error signals to the DCT/quantization unit 203.

The DCT/quantization unit 203 performs a Discrete Cosine Transform (DCT) on the received predictive error signals on an 8×8 or 4×4 pixel basis. Other than DCT, other orthogonal transform techniques, such as a Hadamard transform, may be performed. The DCT/quantization unit 203 acquires frequency components in the horizontal direction and in the vertical direction into which the predictive error signals are separated by using an orthogonal transform.

Owing to space correlation of images, transformation into frequency components causes a group of data to be present in a low frequency component region, achieving effective compression of information.

The DCT/quantization unit 203 quantizes the data (DCT coefficients), which is obtained by using an orthogonal transform, so as to reduce the amount of code of the data. The DCT/quantization unit 203 outputs the quantized values to the entropy encoding unit 204 and the inverse-quantization/inverse-DCT unit 205.

The entropy encoding unit 204 performs entropy encoding on the data that is output from the DCT/quantization unit 203, and outputs the resulting data in the form of a bit stream. The entropy encoding is a scheme for assigning a variable-length code in accordance with the frequency of occurrence of a symbol.

For example, the entropy encoding unit 204 basically assigns a shorter code for a combination of coefficients having a high frequency of occurrence, and a longer code for one having a low frequency of occurrence. This assignment achieves whole codes having a shorter length. For example, in H.264, entropy encoding by using the scheme called Context-Adaptive Variable Length Coding (CAVLC) or that called Context-Adaptive Binary Arithmetic Coding (CABAC) may be selected.

The inverse-quantization/inverse-DCT unit 205 inverse-quantizes the data that is output from the DCT/quantization unit 203. The inverse-quantization/inverse-DCT unit 205 performs inverse-DCT on the inverse-quantized data to convert the frequency components into pixel components, and outputs the resulting data to the decoded-image generation unit 206. The inverse DCT enables acquisition of signals which are nearly equal to the predictive error signals before the encoding.

The decoded-image generation unit 206 adds together MB data of an image obtained by using motion compensation in the motion compensation unit 210 and the predictive error signals decoded in the inverse-quantization/inverse-DCT unit 205. As a result, it is possible to generate a processed image on an encoder side which is equivalent to that obtained on a decoder side.

The decoded image generated on the encoder side is called a locally decoded image. The same processing image is generated on both of the encoder side and the decoder side, enabling differential encoding to be performed on pictures that follow the current picture. The decoded-image generation unit 206 outputs MB data of the locally decoded image that is generated by the addition process, to the deblocking filter unit 207.

The deblocking filter unit 207 performs deblocking filtering (i.e., causes the deblocking filter to be enabled) when the following deblocking-filter conditions are satisfied: Bs>0 (condition 1); |P0−Q0|<α (condition 2); |P1−P0|<β (condition 3); and |Q1−Q0|<β (condition 4). When all of conditions 1 to 4 are satisfied, deblocking filtering is performed.

Among the conditions, Bs is a block boundary strength defined in H.264/AVC, and ranges from 0 to 4. The relation Bs=0 means that the deblocking filter is disabled. The symbols P0, P1, Q0, and Q1 will be described with reference to FIG. 5.

Figure 5:
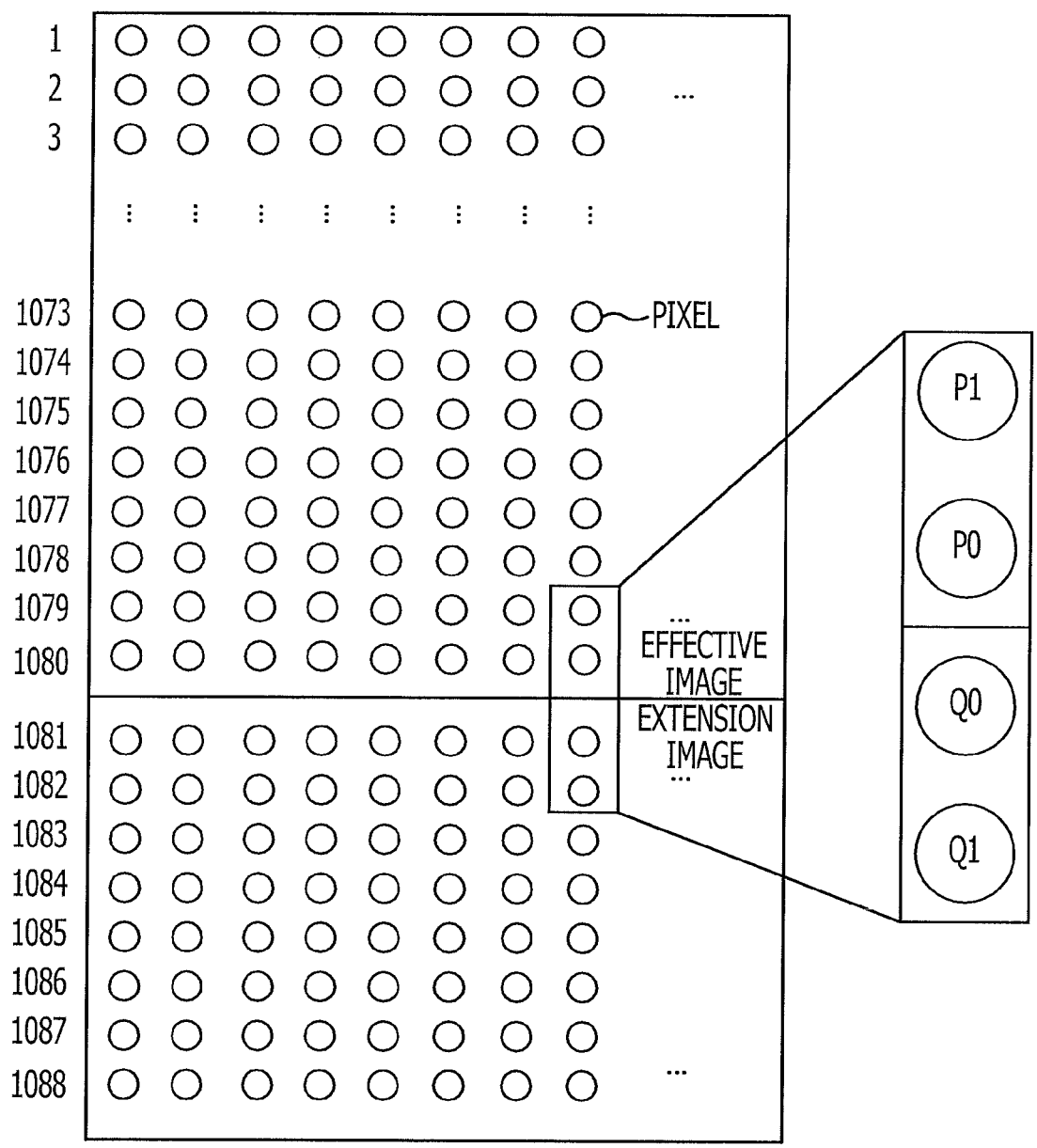
FIG. 5 is a diagram illustrating how an effective image and an extension image are related to each other.

FIG. 5 is a diagram illustrating how an effective image and an extension image are related to each other. Circles illustrated in FIG. 5 represent pixels. As illustrated in FIG. 5, the symbol P0 represents a pixel in the bottom line of the effective image (the original image), and the symbol P1 represents a pixel in the line just above the bottom line. The symbol Q0 represents a pixel in the top line of the extension image, and the symbol Q1 represents a pixel in the line just bellow the top line. The pixel Q0 is called a boundary pixel because this pixel is located at the boundary between the extension image and the effective image, and the pixel Q1 is called a pixel adjacent to the boundary pixel because this pixel is adjacent to the boundary pixel. Pixels adjacent to the boundary pixel do not include a boundary pixel in the horizontal direction.

FIG. 6 is a table describing the threshold β. As illustrated in FIG. 6, the threshold β is set in accordance with the quantizer scale QP. The maximum value of the threshold β is 18. Similarly to the threshold β, the threshold α is set to a value from 0 to 255 in accordance with the quantizer scale QP.

Referring back to FIG. 4, the frame buffer 208 stores MB data obtained after deblocking filtering is performed. The locally decoded image stored in the frame buffer 208 may be used as a reference image.

The motion prediction unit 209 performs motion estimation based on the MB data of the encoding-target image and the MB data of the reference image obtained from the frame buffer 208, and obtains adequate motion vectors.

A motion vector is a value indicating a spatial shift on an MB basis, and is obtained by using a block matching technique for searching for a position in a reference image at which a corresponding MB that is most similar to an MB of an encoding-target image is present, on an MB basis.

In the motion estimation, evaluation values for motion vectors are typically used in addition to the magnitude of a sum of absolute values of differences between pixels, for example. A motion vector is encoded by encoding not the components of the motion vector itself but a difference vector between motion vectors of a target MB and an MB adjacent to the target MB. Accordingly, the motion prediction unit 209 obtains the difference vector, and outputs an evaluation value having a length that corresponds to the length of a motion vector code, by using the magnitudes of the components of the difference vector. The motion prediction unit 209 outputs the estimated motion vectors to the motion compensation unit 210.

The motion compensation unit 210 performs motion compensation on the data of the reference image by using the motion vectors received from the motion prediction unit 209. Through the motion compensation, MB data is generated which serves as a motion-compensated reference image. The motion-compensated MB data is output as a reference image to the predictive-error-signal generation unit 202 and the decoded-image generation unit 206.

Figure 7:
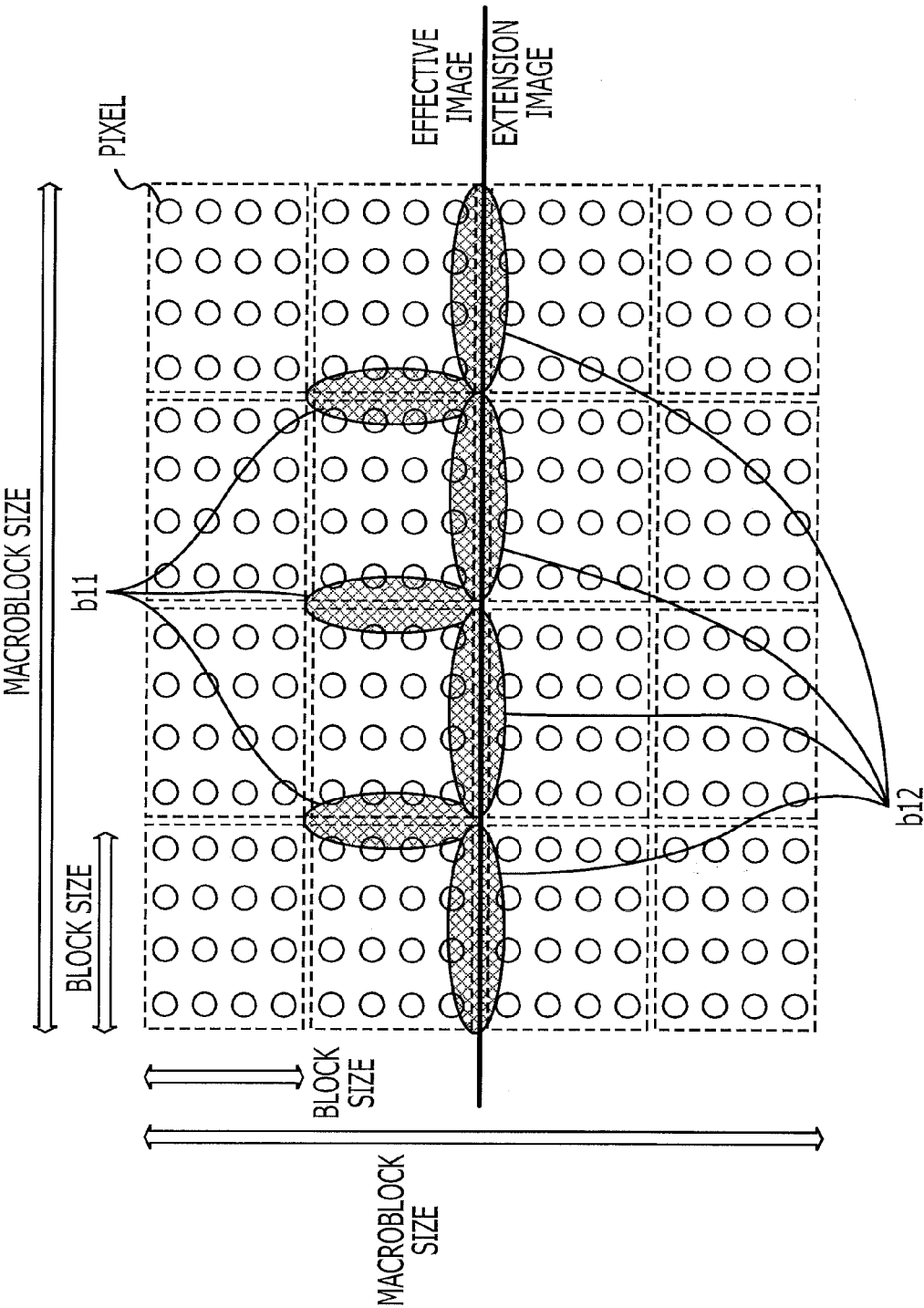
FIG. 7 is a diagram illustrating an example of how a deblocking filter is locally disabled.

Now, according to the embodiment, which regions are not to be subjected to deblocking filtering will be described. FIG. 7 is a diagram illustrating an example of how the deblocking filter is locally disabled. In the example illustrated in FIG. 7, the macroblock size is 16×16, and the block size is 4×4. As illustrated in FIG. 7, determination may be made as to whether or not each of the boundaries between blocks is to be subjected to deblocking filtering.

Boundary regions b12 between the effective image (the original image) and the extension image illustrated in FIG. 7 are regions which are not to be subjected to deblocking filtering so as to suppress the leakage of the extension image. Boundary regions b11 between blocks in the effective image are regions which are to be subjected to deblocking filtering.

When the deblocking filter is to be disabled only for the boundary regions b12, this disablement may be performed by using the relation between the pixels Q1 and Q0 in the extension image, which is represented by condition 4 described above, and the original image does not have to be modified to achieve this disablement. In addition, with consideration of entropy encoding, it is preferable that the extension image be an image that has a small amount of code when the image is encoded, that is, an image having a fixed pattern, for example.

Accordingly, the pixels Q0 and Q1 in the extension image are set so as to satisfy the following relation according to the embodiment: $|Q1-Q0| \geq \beta$ (condition 5). The maximum value of the threshold $\beta$ is 18. Consequently, when the absolute value of the difference between the pixels Q1 and Q0 is equal to or greater than 18, condition 4 is not satisfied. As a result, the deblocking filter is disabled for the boundary regions b12.

Figure 8:
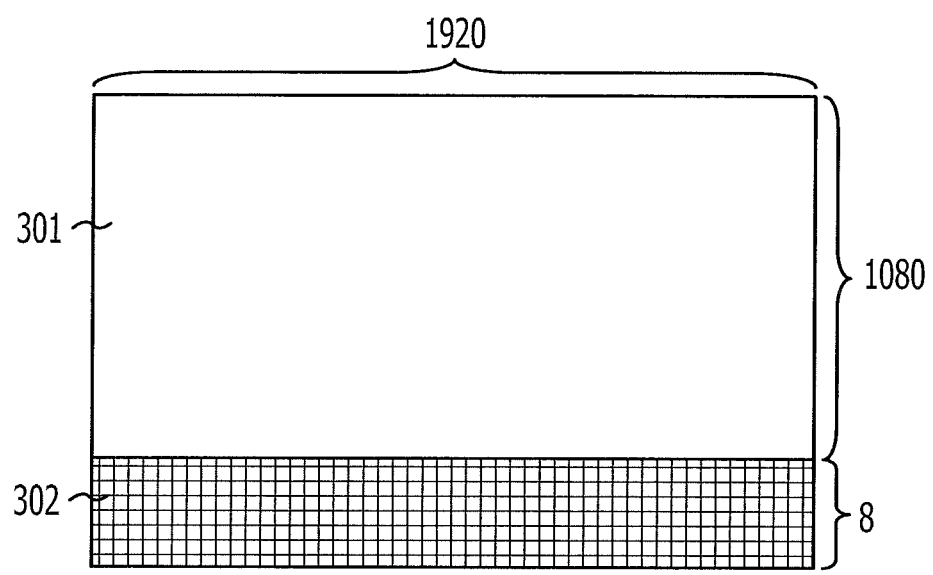
FIG. 8 is a diagram illustrating an exemplary image to be encoded.

Now, an example of the extension image will be described. FIG. 8 is a diagram illustrating an exemplary encoding-target image. As illustrated in FIG. 8, an original image 301 has a size of 1920×1080. The size in the vertical direction is not a multiple of sixteen, which is a macroblock size. Accordingly, an extension image 302 having a size of 1920×8 is to be added to the original image 301 according to the embodiment.

Figure 9A:
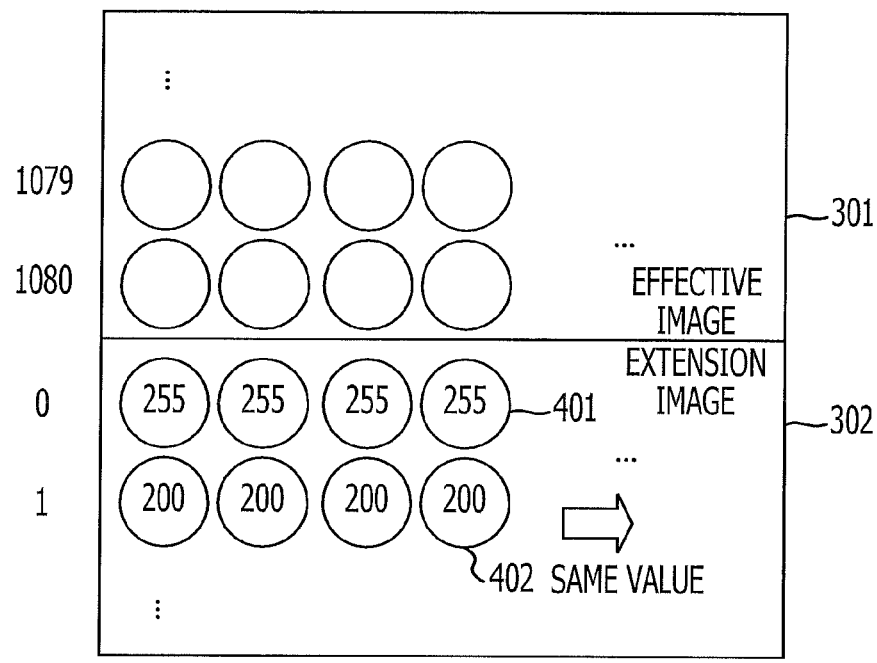
FIGS. 9A and 9B are diagrams illustrating exemplary extension images.
Figure 9B:
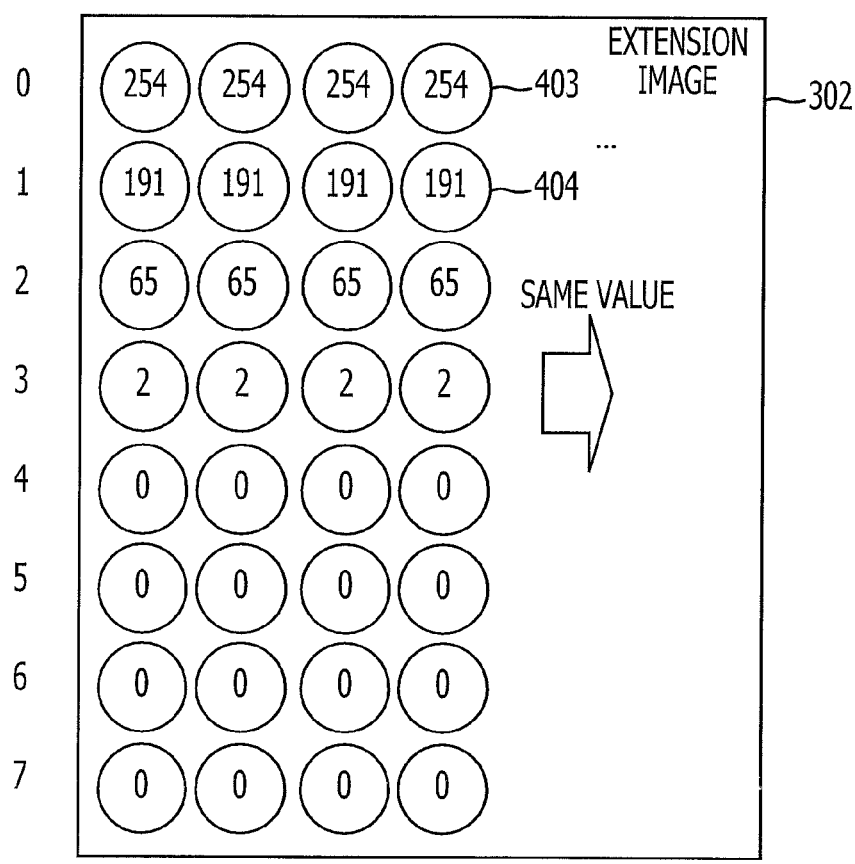

FIGS. 9A and 9B are diagrams illustrating exemplary extension images. FIG. 9A illustrates a first example of the extension image. As illustrated in FIG. 9A, the value of a pixel 401 which corresponds to the pixel Q0 is set to 255, and the value of a pixel 402 which corresponds to the pixel Q1 is set to 200. The absolute value of the difference between the values of the pixels 401 and 402 is equal to or greater than 18. Each of the values of the pixels Q0 and Q1 may be set to any value as long as the absolute value of the difference between the values of a pixel Q0 (a boundary pixel) and a pixel Q1 (a pixel adjacent to the boundary pixel) is equal to or greater than 18.

To reduce the amount of code for an extension image, it is preferable that pixels aligned in the horizontal direction in the extension image have the same pixel value. This is because difference values obtained when the extension image is scanned in the horizontal direction will be zero. The values of the pixels in the 3rd to 7th lines may be set to the single pixel values, for example.

FIG. 9B illustrates a second example of the extension image. As illustrated in FIG. 9B, the value of a pixel 403 which corresponds to the pixel Q0 is set to 254, and the value of a pixel 404 which corresponds to the pixel Q1 is set to 191. The absolute value of the difference between the values of the pixels 403 and 404 is equal to or greater than 18. For example, all of the pixel values in the 0th line are set to 254, those in the 1st line, to 191, those in the 2nd line, to 65, those in the 3rd line, to 2, and those in lines that follow the 3rd line, to 0.

The pixel values in the extension image illustrated in FIG. 9B are set in such a manner that the difference between the pixel values of the 1st line and the 2nd line in the extension image is large (that is, equal to or greater than 18) and that, when these pixels are converted into a DCT coefficient by performing frequency conversion, the DCT coefficient has the smallest magnitude. Accordingly, the image illustrated in FIG. 9B is configured in such a manner that a coefficient which is obtained when frequency conversion is performed has the smallest magnitude, thereby achieving high encoding efficiency.

The extended-data generation unit 102 simply adds a preset extension image having a fixed pattern to an original image, as described above. The processing load is not increased by this adding process.

Figure 10:
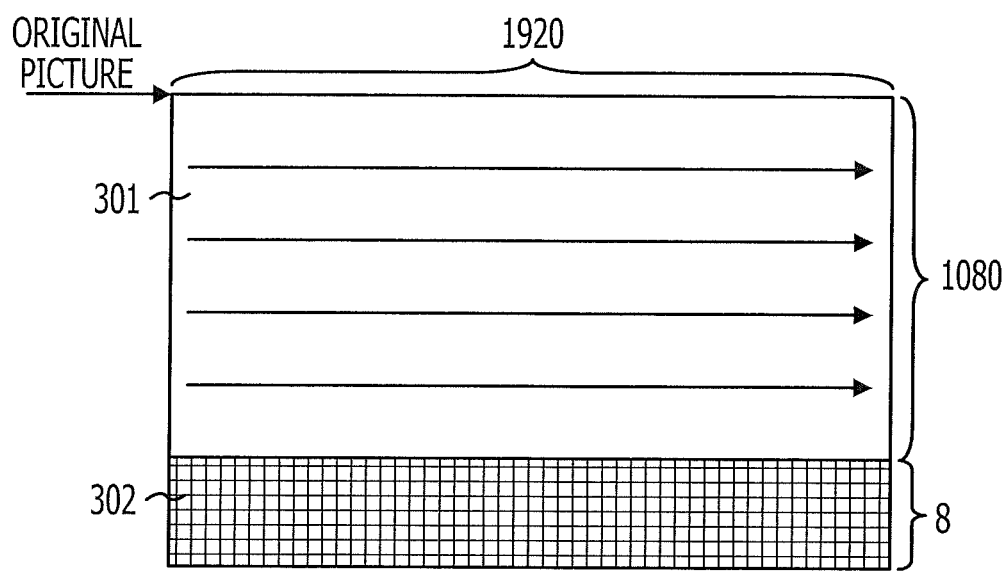
FIG. 10 is a diagram illustrating an exemplary image disposed in a frame memory.

FIG. 10 is a diagram illustrating an exemplary image disposed in the frame memory 101. An original picture is input to the frame memory 101 on a frame-by-frame basis, and is disposed in the original image 301 up to the 1080th line. The original image 301 and the extension image 302 that is arranged in advance are used as an encoding-target image. The pixel values of the effective image (the original image 301) vary in accordance with frames. However, the pixel values of the extension image 302 do not vary because these pixel values are preset.

Figure 11:
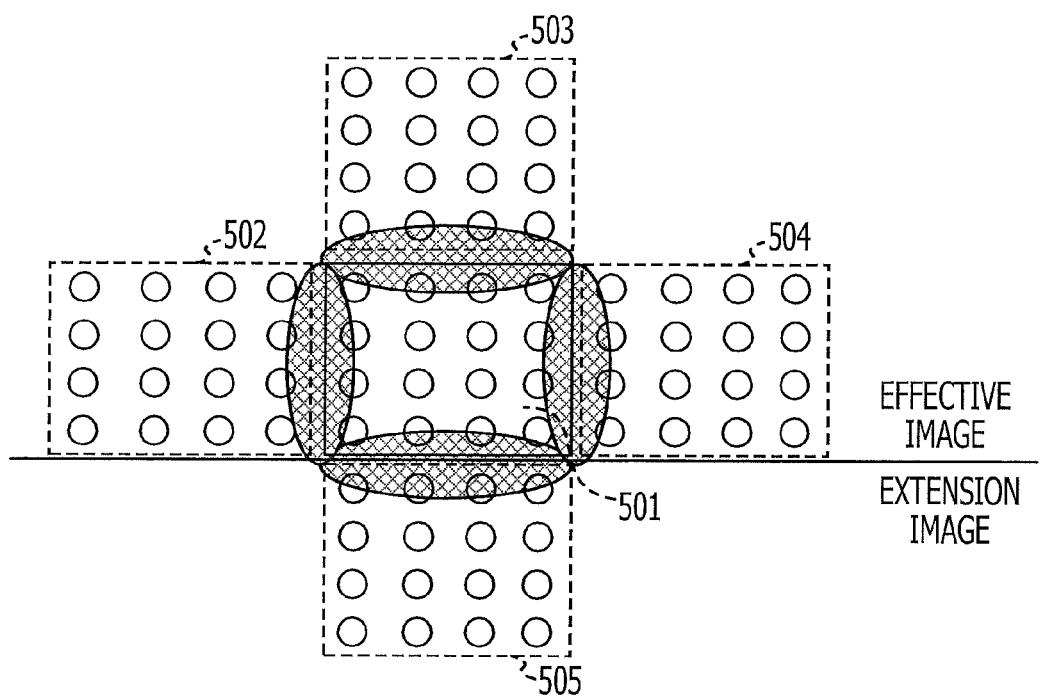
FIG. 11 is a diagram illustrating the relationship between deblocking filtering and blocks.

FIG. 11 is a diagram illustrating the relationship between deblocking filtering and blocks. In the example illustrated in FIG. 11, a block 501 is to be subjected to deblocking filtering. Blocks 501 to 505 are used in this deblocking filtering.

For example, when an original image has a size of 1920×1080, an extension image having eight lines is to be added to the original image. When the pixel values in the extension image satisfy condition 5, the deblocking filter is disabled at a boundary between the blocks 501 and 505. As a result, the leakage of the extension image is suppressed.

Determination of whether conditions 1 to 4 are satisfied is individually made for the boundaries between the block 501 and the blocks 502 to 504, and deblocking filtering is performed in accordance with the determinations. Thus, degradation in image quality owing to, for example, block noise may be suppressed.

In this way, even when the extension image is a preset image having a fixed pattern, the deblocking filter is locally disabled, whereby degradation in image quality is suppressed.

Now, comparison of image quality between the extension method according to the embodiment and those used in the related art will be discussed. FIG. 12 is a table describing a comparison of image quality. As illustrated in FIG. 12, when an image having a black or grey fixed pattern is used for image extension (the first extension method of the related art), image quality is degraded. For example, when the deblocking filter is enabled, image quality is degraded owing to the leakage of the extension image. When the deblocking filter is disabled (for all of the blocks), image quality is degraded owing to block noise.

When an image portion at the edge of an image is extended (the second extension method of the related art) or an effective image is extended according to the embodiment, degradation in image quality is small.

Now, a comparison of processing load between the extension method according to the embodiment and that used in the related art will be discussed. When an image portion at the edge of an effective image is extended, a value of the nearest pixel is returned with respect to pixels in lines that follow the 1080th line.

FIG. 13 is a diagram illustrating an exemplary program for returning a pixel value. In the example illustrated in FIG. 13, x represents a position of a pixel in the horizontal direction, and y, in the vertical direction. When a pixel of interest is in lines that follow the 1080th line, the value of a corresponding pixel in the 1080th line, which is nearest to and just above the pixel of interest, is returned.

For example, each of the following processes (1) to (3) illustrated in FIG. 13 is performed in one cycle: (1) a process of determining whether y is greater than 1080; (2) a process of setting y to 1080; and (3) a process of returning the pixel value. As described above, three cycles are performed in the second extension method of the related art, whereas in the extension method according to the embodiment, the process (3) is simply performed because pixel values are preset in the frame memory 101.

Comparison between the second extension method of the related art and the extension method according to the embodiment is as follows. For example, suppose that the images corresponding to one second are scanned. The second extension method of the related art involves 3×1920×1088×60=376012800 cycles; and the extension method according to the embodiment involves 1×1920×1088×60=125337600 cycles.

When this scanning is performed in a 1-GHz core central processing unit (CPU), the following processing times are taken: 0.376 seconds in the second extension method of the related art; and 0.125 seconds in the extension method according to the embodiment. Therefore, according to the embodiment, the extension process is performed for a shorter time than that of the second extension method of the related art by as much as 0.251 seconds.

FIG. 14 is a table describing a comparison of processing load. As illustrated in FIG. 14, an increase in processing time is small in the extension method using a fixed pattern (the first extension method of the related art) and in the extension method according to the embodiment, whereas an increase in processing time is large in the extension method in which an image portion at the edge of an effective image is extended (the second extension method of the related art).

In short, in the extension method according to the embodiment, degradation in image quality is small and an increase in processing time is small.

Figure 15:
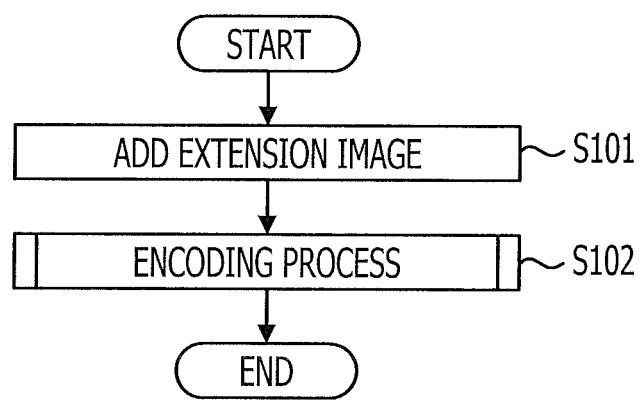
FIG. 15 is a flowchart of an exemplary encoding process according to the embodiment.

Now, operations of the image-encoding device 10 according to the embodiment will be described. FIG. 15 is a flowchart of an exemplary encoding process according to the embodiment. In operation S101 illustrated in FIG. 15, the extended-data generation unit 102 adds an extension image to an original image. Since the extension image is a preset image, the processing time for the extension process is short.

In operation S102, the encoding unit 103 encodes the encoding-target image. The encoding unit 103 is capable of performing deblocking filtering. However, the encoding unit 103 disables the deblocking filter locally for the boundary between the extension image and the original image.

Figure 16:
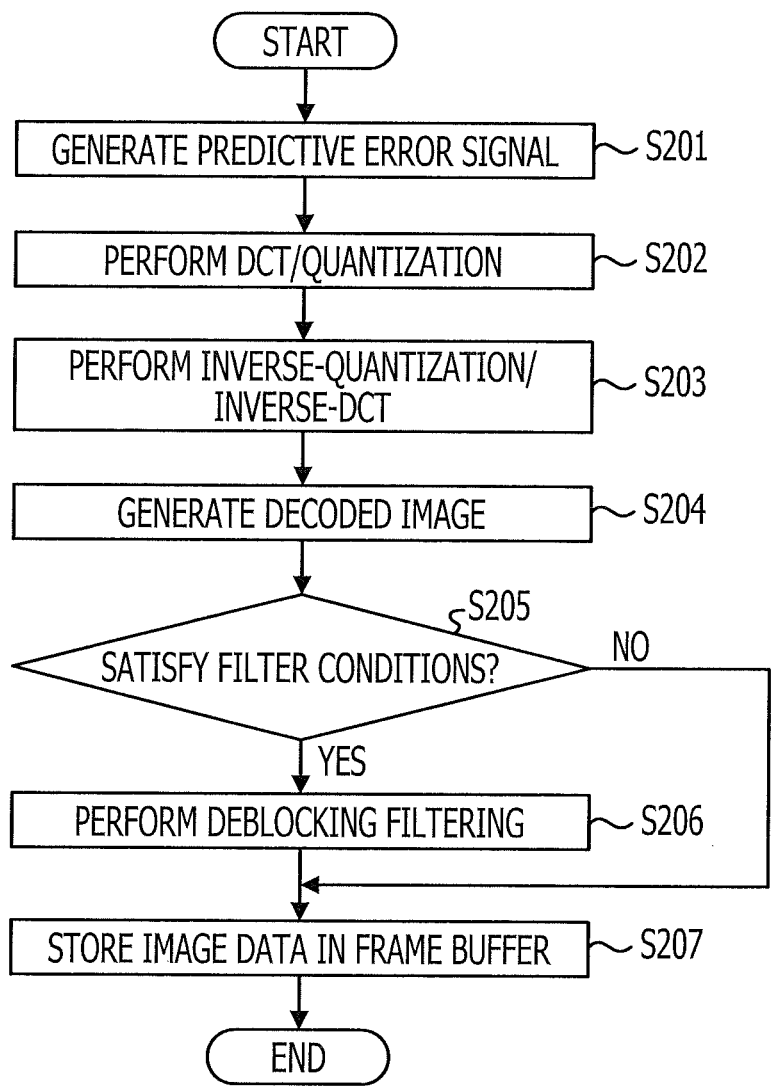
FIG. 16 is a flowchart of an exemplary predictive encoding process performed by the encoding unit.

FIG. 16 is a flowchart of an exemplary predictive encoding process performed by the encoding unit 103. In operation S201 illustrated in FIG. 16, the predictive-error-signal generation unit 202 generates predictive error signals by obtaining differences between the MB data of the encoding-target image and the MB data of the reference image.

In operation S202, the DCT/quantization unit 203 performs DCT and quantization on the predictive error signals.

In operation S203, the inverse-quantization/inverse-DCT unit 205 performs inverse-quantization and inverse-DCT on the quantized values.

In operation S204, the decoded-image generation unit 206 adds together the inverse-DCT data and the data of the reference image, and generates a decoded image. This decoded image is a locally decoded image.

In operation S205, the deblocking filter unit 207 determines whether each of the boundary regions of a block of interest satisfies deblocking-filter conditions 1 to 4. When conditions 1 to 4 are satisfied (YES in operation S205), the process proceeds to operation S206. Otherwise (NO in operation S205), the process proceeds to operation S207.

In operation S205, since the pixel values of the extension image in the boundary region between the extension image and the original image are set in such a manner that these pixel values do not satisfy condition 4, the deblocking filter is disabled for this boundary region.

In operation S206, the deblocking filter unit 207 performs deblocking filtering on the boundaries that satisfy conditions 1 to 4.

In operation S207, the frame buffer 208 stores the image data that is output from the deblocking filter unit 207. This image data is used for motion prediction and motion compensation.

According to the embodiment, degradation in image quality is suppressed at the boundary between the extension image and the original image, and the processing load for the extension process is reduced. In addition, according to the embodiment, pixel values in the extension image may be preset with consideration of encoding efficiency.

According to the above-described embodiment, the extension image is added at the bottom of the original image. However, the extension process according to the embodiment is applicable to an extension process in which the extension image is added at the top of or to the right or left of the original image. In addition, the embodiment employs H.264/AVC. However, any encoding scheme for deblocking filtering may be employed.

Figure 17:
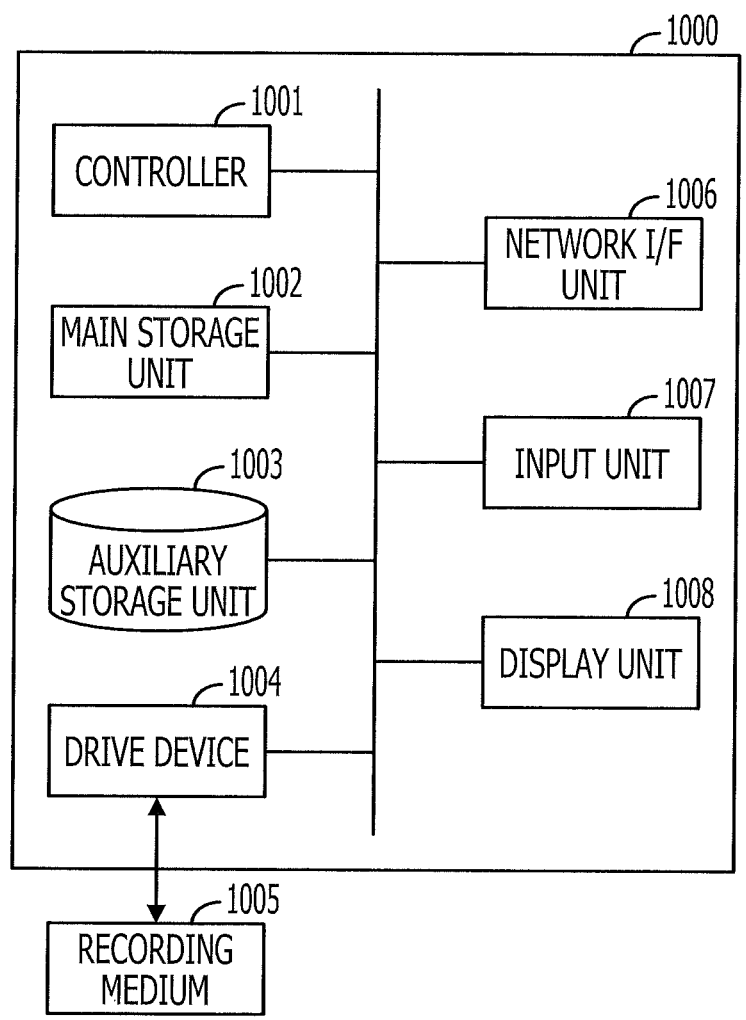
FIG. 17 is a diagram illustrating an exemplary configuration of an image-encoding device.

FIG. 17 is a diagram illustrating an exemplary configuration of an image-encoding device 1000. As illustrated in FIG. 17, the image-encoding device 1000 includes a controller 1001, a main storage unit 1002, an auxiliary storage unit 1003, a drive device 1004, a network interface (I/F) unit 1006, an input unit 1007, and a display unit 1008. These components are connected so as to be capable of receiving/transmitting data from/to each other via a bus.

The controller 1001 is a CPU for controlling devices and for computing and processing data in a computer. The controller 1001 is also an arithmetic-logic unit for executing a program stored in the main storage unit 1002 or the auxiliary storage unit 1003. The controller 1001 receives data from the input unit 1007 and storage devices, computes and processes the data, and outputs the resulting data to the display unit 1008 and storage devices.

The main storage unit 1002 includes a read only memory (ROM) and a random access memory (RAM). The main storage unit 1002 is a storage device for storing programs and data temporarily or for a long time period. These programs include the OS, which is basic software, and application software which are executed by the controller 1001.

The auxiliary storage unit 1003, such as a hard disk drive (HDD), is a storage device for storing data associated with the application software, for example.

The drive device 1004 reads programs from a recording medium 1005, such as a flexible disk, and installs the programs in the storage device.

The recording medium 1005 stores certain programs, and these programs are installed in the image-encoding device 1000 via the drive device 1004. The installed certain programs are ready to be executed by the image-encoding device 1000.

The network I/F unit 1006 is an interface between the image-encoding device 1000 and a peripheral having a communication function and being connected to the image-encoding device 1000 via networks, such as a local area network (LAN) and a wide area network (WAN), which are configured with data transmission lines, such as wired and/or wireless lines.

The input unit 1007 includes a keyboard, which is provided with cursor keys, ten-keys, and various function keys, for example, and a mouse and a slide pad which are used for selecting a key on a display screen of the display unit 1008, for example. The input unit 1007 is a user interface for a user to give operating instructions to the controller 1001 and to input data, for example.

The display unit 1008 is made up of a cathode ray tube (CRT) or a liquid crystal display (LCD), for example. Display is performed on the display unit 1008 in accordance with data received from the controller 1001.

The image encoding process according to the above-described embodiment may be performed by a program that causes a computer to execute the process. This program is installed from a server, for example, and causes a computer to execute the process. Thus, the above-described image encoding process may be performed.

This program may be stored in the recording medium 1005. In this case, a computer or a mobile terminal is instructed to read the recording medium 1005 that stores the program, and the above-described image encoding process may be performed. Various types of recording media may be used as the recording medium 1005. Examples of such recording media include a recording medium for recording information optically, electrically, or magnetically, such as a CD-ROM, a flexible disk, or a magneto-optical disk, and a semiconductor memory for recording information electrically, such as a ROM or a flash memory. The image encoding process according to the above-described embodiment may be implemented in one or more integrated circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it may be understood that the various changes, substitutions, and alterations could be made hereto without departing from the spirit and scope of the invention.

What is claimed is:

1. A method for encoding an image having a resolution that is not a multiple of a size of a block to be encoded, comprising:
    adding, by a processor, an extension image to the image to generate an image to be encoded, the extension image being an image to be added to the image and being an image in which a boundary pixel that is present at a boundary between the extension image and the image, and an adjacent pixel that is adjacent to the boundary pixel have a difference in pixel value therebetween that has an absolute value that is equal to or greater than a certain value; and
    suppressing leakage of the extension image, by disabling a deblocking filter process at the boundary between the extension image and the image in a locally decoded image that corresponds to the image to be encoded.

2. The method according to claim 1,
    wherein the extension image is an image in which a Discrete Cosine Transform coefficient obtained after frequency conversion has the smallest magnitude.

3. The method according to claim 1,
    wherein the certain value is at least 18 which is a maximum value of a threshold.

4. The method according to claim 2,
    wherein the certain value is at least 18 which is a maximum value of a threshold.

5. An image-encoding device that encodes an image having a resolution that is not a multiple of a size of a block to be encoded, comprising:
    a processor; and
    a memory which stores a plurality of instructions, which when executed by the processor, cause the processor to execute,
    adding an extension image to the image to generate an image to be encoded, the extension image being an image to be added to the image and being an image in which a boundary pixel that is present at a boundary between the extension image and the image, and an adjacent pixel that is adjacent to the boundary pixel have a difference in pixel value therebetween that has an absolute value that is equal to or greater than a certain value; and
    suppressing leakage of the extension image, by disabling a deblocking filter process at the boundary between the extension image and the image in a locally decoded image that corresponds to the image to be encoded.

6. The device according to claim 5,
    wherein the extension image is an image in which a Discrete Cosine Transform coefficient obtained after frequency conversion has the smallest magnitude.

7. The device according to claim 5,
    wherein the certain value is at least 18 which is a maximum value of a threshold.

8. The device according to claim 6,
    wherein the certain value is at least 18 which is a maximum value of a threshold.

9. A non-transitory computer-readable storage medium storing an image-encoding program that encodes an image having a resolution that is not a multiple of a size of a block to be encoded, the image-encoding program causing a computer to execute a process comprising:
    adding an extension image to the image to generate an image to be encoded, the extension image being an image to be added to the image and being an image in which a boundary pixel that is present at a boundary between the extension image and the image, and an adjacent pixel that is adjacent to the boundary pixel have a difference in pixel value therebetween that has an absolute value that is equal to or greater than a certain value; and
    suppressing leakage of the extension image, by disabling a deblocking filter process at the boundary between the extension image and the image in a locally decoded image that corresponds to the image to be encoded.

10. The non-transitory computer-readable storage medium according to claim 9,
    wherein the extension image is an image in which a Discrete Cosine Transform coefficient obtained after frequency conversion has the smallest magnitude.

11. The non-transitory computer-readable storage medium according to claim 9,
    wherein the certain value is at least 18 which is a maximum value of a threshold.

12. The non-transitory computer-readable storage medium according to claim 10,
    wherein the certain value is at least 18 which is a maximum value of a threshold.

13. The method according to claim 1, further comprising:
    adding, by a processor, an extension image to the image so that the image to be encoded is a multiple of the block size.

* * * * *